Feb. 12, 1963 B. H. SCHAUB 3,077,121
AUTOMATIC TRANSMISSION CONTROL
Original Filed Sept. 19, 1955 3 Sheets-Sheet 1

INVENTOR
Benton Hall Schaub

BY Moore, Hall and Pollock
ATTORNEYS

Feb. 12, 1963  B. H. SCHAUB  3,077,121
AUTOMATIC TRANSMISSION CONTROL
Original Filed Sept. 19, 1955  3 Sheets-Sheet 2
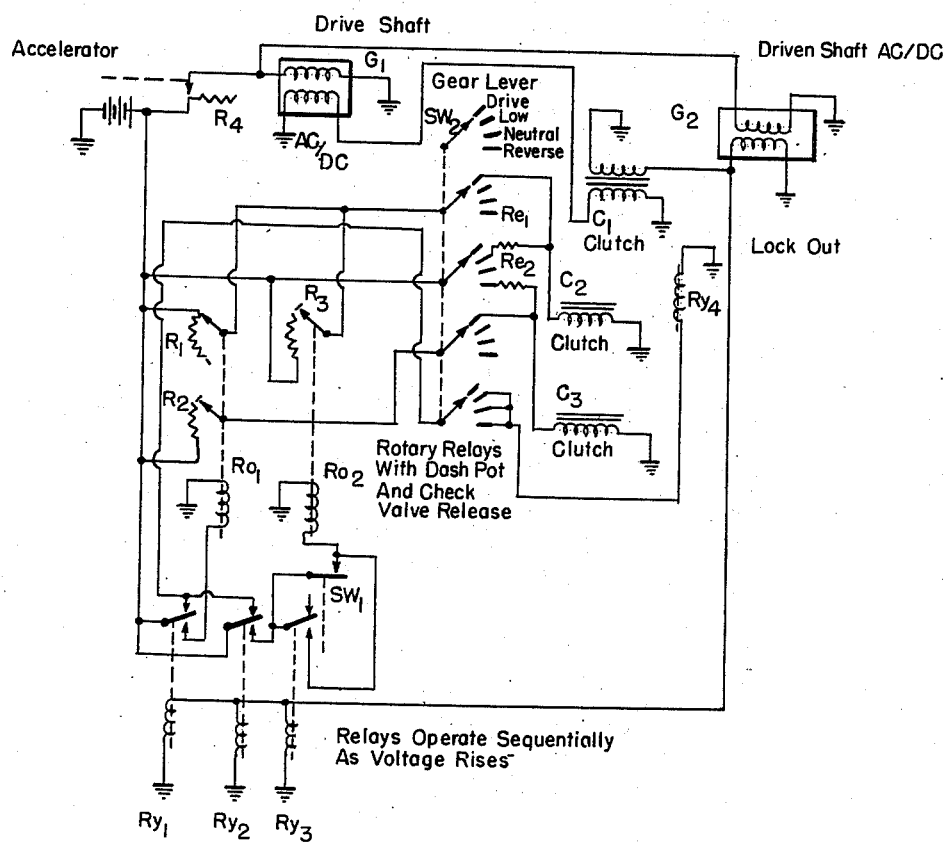
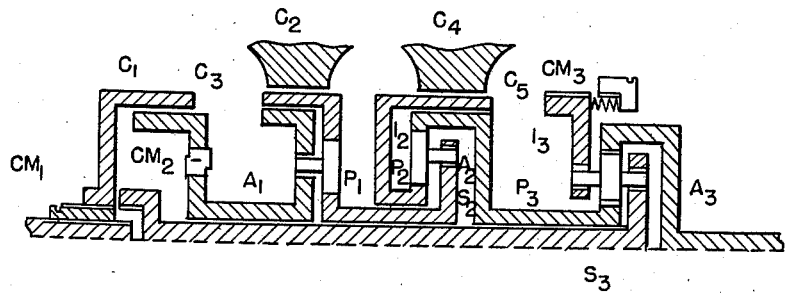
INVENTOR
Benton Hall Schaub
BY Moore, Hall and Pollock
ATTORNEYS INVENTOR
Benton Hall Schaub

3,077,121
AUTOMATIC TRANSMISSION CONTROL
Benton Hall Schaub, Gambrills, Md.
Original application Sept. 19, 1955, Ser. No. 535,011. Divided and this application May 29, 1957, Ser. No. 662,412
18 Claims. (Cl. 74—472)

This invention concerns improvements in power drive, torque clutches, speed reduction and the like both for light and very heavy applications.

It is an object of the invention to provide a smooth control for the application of heavy loads.

It is an object of the invention to provide means for high efficiency speed reduction or speed change without axial shift of gears.

It is an object of the invention to provide means for the automatic control of speed ratios to meet changing load and operating conditions in vehicular transmissions.

It is an object of the invention to provide means for the automatic control of speed under varying load conditions.

It is an object of the invention to provide means for the automatic control of torque under varying speed conditions.

The present application is a division of U.S. application Serial No. 535,011, filed September 19, 1955, and now abandoned which is a continuation-in-part of my U.S. Patent No. 2,718,157, granted September 20, 1955, on copending application Serial No. 18,842, filed April 2, 1948, for Power Transmission System.

It is an object of the invention to provide means for the automatic control of spaced ratios to meet changing load conditions and operating demands in vehicular and other transmissions without axial shift of gears by utilizing planetaries or plural drives with a plurality of magnetic particle clutches for sequential engagement and/or release.

It is an object of the invention to provide a power drive or transmission having a drive shaft, a driven shaft, means connecting said shafts in a power transmitting relation comprising a housing having finely divided magnetic material therein, a disc, cylinder or the like of metal embedded in or in contact with said material and a magnetic flux producing winding mounted either on or adjacent said housing and arranged to cause magnetic flux to affect said magnetic material, an electrical circuit comprising a first source of electrical potential having an effective value which is a function of the angular velocity of said drive shaft, a second source of electrical potential having an effective value which is a function of the angular velocity of said driven shaft and conductors including a variable impedance connecting said source of potential to said winding.

The invention lends itself to application in the automotive field, diesel and steam locomotives, heavy duty cranes, elevators, air plane engines, propeller and supercharger drives and controls, speed governors, lost motion devices for limiting the application of torque or other load, as well as in the lighter fields of control and indication.

It is an object of the invention to provide means for the automatic control of speed ratios to meet changing load conditions and operating demands in vehicular transmissions without axial shift of gears by utilizing planetaries or plural drives with a plurality of magnetic particle clutches for sequential engagement.

It is an object of the invention to provide an inexpensive magnetic particle transmission with automatic control and over-riding manual control which provides smooth transition from one drive relationship to another.

It is an object of the invention to provide a magnetic particle clutch and an automatic transmission comprising one or more magnetic particle clutches in which the magnetic particles comprise an alloy resistant to oxidation and corrosion such as iron-nickel, iron-cobalt, iron-titanium, iron-chromium, iron-manganese, Al-Ni-Co and combinations of the above. While iron-ferrous combinations may be used, in general alloys with iron are presently preferred with enough carbon included to make steel of the iron.

It is an object of the invention to provide a magnetic particle clutch having magnetic journal seals to prevent contamination of bearings by fine or powdered material.

It is an object of the invention to prevent contamination of journal and bearing in a magnetic particle clutch by using magnetic filings of large enough size that they are excluded by the ordinary bearing with or without a packing gland.

It is an object of the invention to provide smooth transfer from a high to a lower gear ratio by the action of a single clutch engagement in which the stored kinetic energy in the engines and the fly-wheel is added to the normal power output of the engine at the time of engagement whereby additional acceleration is achieved.

The magnetic material employed herein may comprise one or more of the following materials alone or as alloys: iron, carbonyl iron, magnetite, steels of various kinds, nickel, cobalt, manganese, titanium, aluminum, chromium and the like. Various alloys may be employed such as Al-Ni-Co, permalloy, alfenal an aluminum-iron combination. Bismuth may be used because of its dimagnetic properties. Magnetic alloys containing chromium, nickel, tungsten for example resist oxidation and corrosion. Carbon in the steels for example hardens the particles to resist erosion and crumbling. Tungsten and nickel increase the hot strength of the particles. Copper or silver may be added to increase the heat conductivity of the mass. Beryllium may be added to harden the copper.

The various materials listed having the necessary magnetic properties may be used alone as a powder, colloidal particles, filings, finely divided material or particles of various shapes and sizes. The materials may be separately powdered and used as a dry mixture or alloyed to achieve the desired characteristics. Mixtures in some cases yield improved magnetic properties, increased Curie point, better release on removal of the magnetic field, longer active life under load, better heat dissipation, resistance to corrosion and erosion. The heavier automotive, ship and railway applications require far more care in selection while the light control applications operate well with almost any reasonably magnetic material.

In general, carbonyl iron alone or alloyed with nickel, cobalt, tungsten, and/or aluminum for heat resistance have been found successful. The so-called "stainless" steels, with or without chromium content, are really stain or rust resistant and are useful in many applications.

Various additives or vehicles may be employed for lubricant purposes such as oil, kerosene, benzene, graphite, chalk, mica, soapstone, the silicones or glycerine. In addition to lubrication these materials have a "chain-breaking" function on removal of the magnetic field in that they facilitate particle release. Silicones and glycerine have temperature advantages.

Journal sealing bearings as employed herein may be special constructions known to the art employing scrapers, magnetic traps, sealing rings and the like to prevent powder from penetrating the bearings or the term may be applied to bearings having a smaller clearance than will permit magnetic filings to enter the bearing proper. For this purpose filings are preferable and the films are screened out. The magnetic material selected for such application should be tough enough to resist fracture into pieces small enough to enter the bearings themselves. When magnetic traps or special rings are not used the particles should all be of a size large enough not to enter the bearings. The term journal sealing bearings as used herein is intended to cover and include this correlation of particle size and bearing clearance as well as the special constructions mentioned above.

Particle shape and relative size are factors which should be taken into account for various clutch applications. A mass of particles of different sizes and angular shape provides a close packed highly permeable mass. Regular size and rounded shape like a bunch of marbles tends to prevent packing and joining. Spheres may be preferred for applications requiring quick release if the material selected provides a sufficiently permeable mass. Hemispheres, trihedrons, quadrahedrons, cubes and the like can be used. Again rough filings and fractured irregular particles have been successful though screening of fines usually improves the resultant mass.

Where vehicle is used whether it is oil or graphite the heavier applications such as automotive, ship or railway give better results where the amounts are small. This is particularly true of oil with volatile constituents or tarry residues. Larger amounts of graphite may normally be used where heavy loads are involved than oil because of its greater stability. Usually with oil a film is sufficient though more may be used if desired where the character of load permits. The film formed around the particles may be dry as in the case where the volatile part of the vehicle has been evaporated, leaving a thin film or coating around the individual particle.

The mix preferred for general use is the dry mix which may comprise carbonyl iron powder or an iron alloy alone, a mixture of several different magnetic material particles, with or without graphite or small amounts of oil, kerosene or benzene with the more volatile constituents evaporated. Where bearing contamination or oil carbonization due to excessive particle heating under highly localized loads is not a factor, oil may be used much more liberally. In such cases elimination of the flux gaps may become a factor of importance. A lightly sintered or spongy mass of iron particles could provide the flux gap bridge in such cases, but might possibly fail to give sufficient depth of slip in some cases.

A factor of some importance in heavy load applications lies in the "give" in the mating clutch surfaces or the depths of mass in relation to surface contact area. Sufficient depth or thickness of the particle mass is necessary to prevent grabbing on load application and to provide positive smooth application of torque. In planetaries the material comprising the particle mass may be an annular band of an eighth of an inch or less in thickness.

In the drawings like numerals refer to like parts throughout.

FIGURE 4 is a schematic circuit diagram representing one form of control for the transmission of FIGURE 3.

FIGURE 5 is a partial schematic sectional view of one form of five speed planetary transmission with reverse according to the invention.

Figure 1:
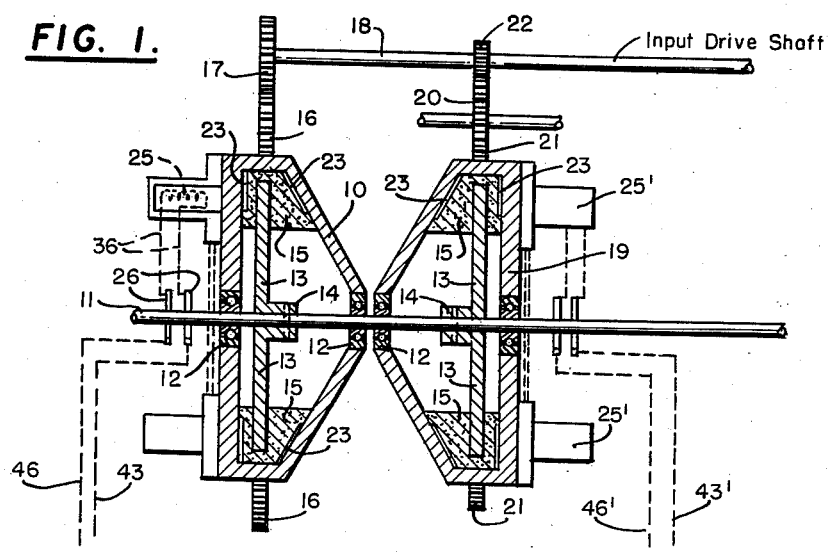
FIGURE 1 is a schematic sectional showing of one form of power transmitting means.

In FIGURE 1 housing 10 is mounted on output shaft 11 by journal sealing bearing 12. A disc 13 is mounted on shaft 11 within housing 10. Disc 13 rotates with shaft 11, being keyed, pinned as at 14 or otherwise fastened thereto. Within housing 10 is magnetic material 15 which may be of colloidal character, a powder, filings or the like. The medium carrying the magnetic material may be any medium which forms a suitable vehicle for the finely divided magnetic material. Housing 10 is surrounded by a ring gear 16 which meshes with pinion 17 on power input shaft 18.

Housing 19 is a counterpart of housing 10 in all respects save that it rotates in the opposite direction by idler gear 20 which mates with ring gear 21 and pinion 22 mounted on input shaft 18.

As housings 10 and 19 are rotated, fins 23 may be used to assure that material 15 is accelerated and quickly forms an annular ring around the periphery of disc 13. A relatively weak magnetic field will cause a relatively large cohesive effect among the various magnetic particles of material 15 which are thereby caused to grip the embedded portion of disc 13. Over a quite large range the gripping effect of material 15 on disc 13 is such that the relation between the field applied and the gripping action varies as a function of the flux density. This relation may be substantially linear through a given range.

It will be seen that fins 23 now have an additional function. As the magnetic mass 15 coheres and compacts itself it may tend to reduce the reaction of the walls of housings 10 and 19 upon certain portions of it which in turn may reduce the frictional effect. This is particularly true where the viscosity of the material 15 plus its vehicle approaches that of a pasty mass or a dry mixture forming a powder. When the magnetic mass 15 plus its vehicle is a pasty mass or a powder it is readily retained by journal or bearing seals 12, the bearings themselves being subject to wear and greatly shortened life if the vehicle is so fluid that it carries the very fine particles into the bearing and between the sliding or rolling surfaces thereof. Fins 23 then have a positive action upon the material 15. If desired fins 23 may be replaced by radial channels on the inner walls of housings 10 and 19. However, sufficient vehicle may be added to keep the magnetic mass sufficiently "fluid" that normal acceleration will help to press it tightly against housing 10 when in powder form, which may be the normal case in any event where the magnetic material alone or with its vehicle is in the powder form.

The field acting on material 15 may be created by stationary coils which may be positioned around the periphery of housings 10 and 19 or may be a distributed winding. Where the flux loss must be reduced moving coils 25 may be substituted for stationary coils. Moving coils 25 are supplied with power through slip rings 26. Where this form is used a second pair of slip rings would be mounted adjacent housing 19.

It is one object of the invention to control the field of coils 25' or 25 by connecting in series therewith a generator 40 driven by input shaft 18, generator 41 driven by output shaft 11 and variable impedance 42. One such electric circuit would be a group of movable coils 25, lead wires 36, slip rings 26 with their contacts, wire 43, generator 40, wire 44, generator 41, wire 45, variable impedance 42 and wire 46 back to slip rings 26.

Generators 40 and 41 may be quite small with a rated capacity of from 5 to 50 watts and may in general be either A.C. or D.C. On the other hand, where the load is large as in automobiles, railway locomotives, cranes and the like, the size of the generators 40 and 41 as well as housings 10, 19 may be relatively large. They are connected in series with their voltages cumulative. As the gripping action of material 15 is very large for a small field current, generators 40 and 41 probably need not exceed a half horse power for any save the very heaviest applications.

It will be appreciated that upon removal of the magnetic field or a decrease in its intensity, a corresponding decrease in the gripping action of the clutch should occur. Where there is substantial residual magnetism in the particles or filings the chains of magnetic particles can produce a drag which is highly undesirable. One function of the material added to the particle mix which is quite aside from lubrication is to cause the prompt breakdown of the magnetic particle chains on removal of the energizing field. This is accomplished by the actual physical separation of particles by a thin coating such as an oil film or the non-magnetic material added to the mix when in powder form. Elsewhere, mention is made of prevention of corrosion of the magnetic particles to maintain their characteristics. This is quite a different matter and is not limited to thin coatings which may result from mere surface oxidation or the like. Such thin coatings whether a film of oil, glycerine, or the like can in some applications be beneficial in eliminating drag. The above effect may be quite independent of any lubrication property as such which may or may not be present depending upon the material used or the character of the coating. A powder mix with magnetic filings may have particles so different in size that the filings are separated by powder which may roll ball-like between adjacent filings to decrease friction and at the same time eliminate drag by breaking the chains of magnetic particles on the removal of the field. Again when steel filings are combined with powdered magnetite the chain breaking function can be obtained even though both materials are magnetic because of the spacing of the larger filings by the magnetite granules and the resultant constriction of the flux path with an increase in reluctance.

It should be noted that when the effect of the magnetic field is removed and slip between housing 10 and plate 13 occurs, fins 23 and their equivalent channel structure also afford a mechanical chain breaking action by stirring the powder mix 15.

Figure 2:
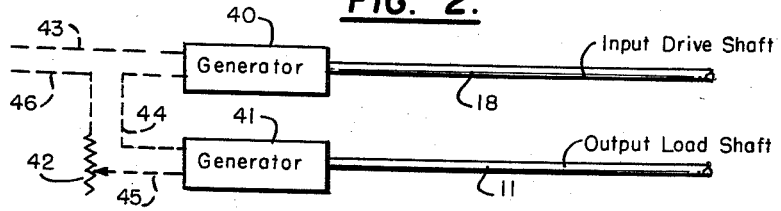
FIGURE 2 is a schematic showing of a control diagram according to the invention.

In the transmissions of FIGURES 3-6 inclusive, using structure based on FIGURES 1 and 2 applied to controlled planetary transmissions, a dry mixture of graphite and soft iron filings, carbonyl iron or one of the rust resistant steels will give good results. The magnetic materials may be used alone or a mixture of them employed without graphite. The addition of nickel, cobalt, tungsten or the like as an alloy or as a physical mixture can be useful as discussed above. Clutch surfaces will stand up well if manufactured of mild steel, U.S. Military Specification 47511. A principal problem may result from extremely high temperatures generated at points of contact. These temperatures build up in very small areas so rapidly that heat conduction becomes important. Grease, oil or other organic contamination will carbonize. Clutch plates or surfaces can be laminated with a central layer of copper. Any contaminating material which breaks down chemically or physically under the conditions within the clutch is likely to cause jamming. Insulation material on electrical circuits and grease from bearing surfaces are possible sources of potential trouble. Baked silicon varnishes and glass fabrics are good for insulation.

Jamming is less likely with a drum design in which the clutching action is between two concentric cylinders. To the extent possible control coils should be located on fixed structures with the purpose of reducing the number of or eliminating slip rings without unduly interfering with the controllable uniform flux distribution over the clutch surfaces.

Currents of about two amperes supplied by a three-volt source will control twenty horsepower at 1700 r.p.m. satisfactorily. A clutch surface two inches long and ten inches in diameter gives good results at such load.

The planetary systems of FIGURES 3-6 inclusive are indicated in cross section of the gear train when a planet is up in each planet system. The schematics show only the top half of the gear train, so each part except the planets can be considered a figure of rotation. In these figures the arm or spider which carries the planet pinion gear or gears is referred to as A, the central pinion or sun gear S, the internal or ring gear I. Subscripts help identify individual elements in the several figures. Rheostats are referred to as R, relays as Ry, rotary relays as Ro, magnetic clutches as C and manually operated clutches, over-ride clutches or spline engagements as Cm. Direct drive, paralleled up to the final planetary connection by the geared drive is preferred because it gives more control with fewer components and provides a system whereby gear ratios can be shifted without placing a braking force on the engine such as is usually experienced in present day automatic shifts. One method of accomplishing this action is by the provision of an overriding clutch such as $Cm_2$ which is electrically or mechanically locked out for reverse drive.

Three Speed Transmission With Reverse

Figure 3:
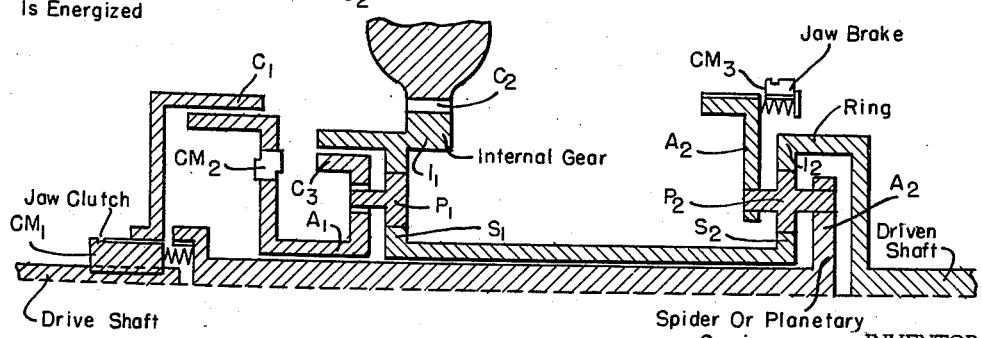
FIGURE 3 is a partial schematic sectional view of one form of three speed planetary transmission with reverse according to the invention.

In FIGURES 3 and 4, clutch $C_1$ is the primary control clutch having its inner or driven member embedded in an annular cylindrical band of magnetic particles 15 surrounding it and confined between the two annular clutch faces in torque transmitting relation thereto. Transmission brake $C_2$ and clutch $C_3$ are gear controlling transmission members. Jaw clutch $Cm_1$ and $Cm_3$, which is a jaw engaging device to ground and therefore a brake, are primarily mechanically set friction bands or other engagements such as a spline. $Cm_1$ is engaged for forward operation and $Cm_3$ for reverse. When $Cm_1$ is engaged the engine drive is connected to clutch $C_1$ and to spider $A_2$ carrying planet pinion $P_2$. When $Cm_1$ is disengaged, the engine drive is connected only through the clutch $C_1$. When $Cm_3$ is engaged $Cm_1$ must be disengaged because $Cm_3$ holds spider $A_2$ to the frame preventing it from rotating. The springs in these clutches are schematic indication of synchronizing clutches which would assist in bringing the drive to the proper speed for easy engaging. Both engaging devices $Cm_1$ and $Cm_3$ are shown disengaged or in the neutral shift position.

The clutch $Cm_2$ is an overriding clutch with a mechanically or an electrically actuated locking device. When the drive is operating in forward drive condition $Cm_2$ prevents spider $A_1$, carrying pinion $P_1$, from rotating faster than the driven member of control clutch $C_1$ but permits $A_1$ to move slower than $C_1$ without restraint. This free wheel is locked out so that $A_1$ is solidly connected to the driven member of $C_1$ whenever the drive is in reverse. When the drive is operating in low this clutch $Cm_2$ may also be locked out thereby providing dynamic braking by the engine for descending steep hills or operating on slippery surfaces, etc.

In the above disclosure, "gear shifting" in the sense that gear faces are physically engaged and disengaged in the classical sense with other gear faces is not intended. However, in referring to the possible utilization of spline clutching surfaces spline type gears in positions $Cm_1$ and $Cm_2$ are manually shifted. A brake may be regarded as an engaging device to frame or to ground and a clutch which controls the torque connection and disconnection between two members may provide braking action when one of the members resists movement whether because of speed differential or a connection to frame or ground or both of these factors acting simultaneously.

FIGURE 4 shows the gang switch $Sw_2$, driven by the gear shift lever, in the drive position. Other shift positions may be selected manually as marked at the top of the switch, the dotted lines denoting mechanical coupling. This mechanical motion or some electrical or hydraulic action now shown is also to be utilized to shift mechanical engagements $Cm_1$ and $Cm_2$ under the proper conditions.

The rotary relays $Ro_1$ and $Ro_2$ are slow operating, but have quick return. The relays $Ry_1$, $Ry_2$, and $Ry_3$ operate at increasing voltage levels resulting from increased speed of generator $G_2$ connected to the output shaft of the transmission. When the transmission is shifted to low or reverse the override clutch $Cm_2$ is locked inoperative by $Ry_5$ and the circuit from $G_2$ to $Ry_1$, $Ry_2$, and $Ry_3$ is opened by a relay $Ry_4$ as shown. This circuit could be opened through contacts on $Sw_2$. Under this condition the transmission is held in its lowest gear ratio and controlled completely by $G_1$ through clutch $C_1$. The coils shown on $C_1$, $C_2$, and $C_3$ represent control winding on the magnetic particle clutches.

The sequence of operation of the transmission is as follows:

Engine idling with shift in neutral—all clutches de-energized or unengaged. When $C_1$ is not engaged the rotation of $A_2$ causes $P_2$ to rotate driving $S_2$ and therefore $P_1$, whose internal gear $I_1$ is held stationary, causes $A_1$ to rotate. $A_1$ is free to rotate until $C_1$ is actuated and no torque is therefore applied to $I_2$ until $C_1$ is actuated. $I_2$ is the output or driven shaft. As the engine is accelerated, generator $G_1$ engages clutch $C_1$ but due to circuits to other clutches being open, see electrical schematic FIGURE 4, no torque is transmitted. Engine idling, the shift lever $Sw_2$, is moved to drive position. Clutch $Cm_1$ is manually engaged to lock a direct drive from engine to spider or planet carrier $A_2$. Engaging device $C_2$ is electrically energized and holds stationary the internal gear $I_1$. As the engine is accelerated the output of $G_1$ increases the torque transmitted by $C_1$. When this clutch engages, transmission drive to load is at a reduced gear ratio or low. As the load accelerates the output of $G_2$ increases and relays $Ry_1$, $Ry_2$ and $Ry_3$ close sequentially with increased speed of transmission output shaft. When $Ry_1$ operates the relay $Ro_1$ is energized and slowly operates the two rheostats $R_1$ and $R_2$, $R_1$ gradually decreasing the current to $C_2$ until it opens the electrical control circuit completely, thereby disengaging the clutch $C_1$ while $R_2$ gradually increases the current to $C_2$ until it fully engages that clutch. The control circuit to clutch $C_2$ is opened by $R_1$ when fully actuated by $Ro_1$ prior to operation of $Ro_2$. $R_3$ is on a dead open section prior to actuation of $Ro_2$. The transmission is then operating in a direct drive 1 to 1 ratio. Although the proposed scheme shows rotary relays operating rheostats other systems of modifying the impedances in these clutch circuits would be satisfactory depending upon operation requirements. If the clutches are operating on A.C., as an example, the changing of iron in a choke circuit could work out well. The source of the clutch actuating current could be the controlling generator $G_1$ or $G_2$ and this could be an A.C. generator for design simplicity. At a higher output shaft speed when $Ry_2$ operates, $C_3$ remains engaged as $Ry_1$ and $Ro_1$ are not affected. The rotary relay $Ro_2$ is actuated and it slowly increases the current to clutch $C_2$ thereby locking that plentary system stationary and holding the sun gear $S_2$. $C_3$ engages when $Ro_1$ operates thus holding $I_1$ stationary to frame. If under these conditions $C_3$ holds $A_1$ to $I_1$, the entire planetary system will be held stationary or locked when $Ro_2$ engages $C_2$, holding $I_1$ stationary. Clutch $Cm_2$ is now operating and permits $C_1$ driven member to rotate with the engine while spider or planetary carrier $A_1$ is stationary. The drive is now at its high ratio. Prior to the operation of $Ry_3$, if the accelerator is fully advanced, a mechanically actuated switch $Sw_1$ opens the leads to $Ry_2$ which returns the transmission to the direct drive ratio to provide quick acceleration (kick-down). As the load speed becomes higher $Ry_3$ operates and parallels the $Sw_1$ circuit. When this happens kick-down would not provide increased acceleration. If the drive has reached this speed while in second ratio it is shifted to high at this time.

As can be seen during shift clutch $C_1$ could exert a retarding torque. During sequence of shifting when $C_2$ and $C_3$ are both partially energized the load side of $C_1$ could be braked. Without the override this would act as a brake on the driving source. Also in shifting to high this drive is held stationary and it would become necessary to de-energize $C_1$ in order to continue. With the override clutch $Cm_2$ this is unnecessary. This transmission will utilize the inertia stored in the engine and fly wheel to accelerate the load.

With this transmission the operator can shift from one ratio to another at any time without damaging the mechanism. As an example with the transmission applied to an automobile the car could be traveling in high and be shifted to low or even reverse to provide emergency dynamic braking. Important in this sequence would be timing the operation of the override $C_2$ lock out mechanism so as to be actuated while there was no reverse load on the clutch $Cm_2$. The lockout mechanism is a standard device which makes the overrunning engaging device $C_2$ inoperative to produce a non-clutched drive. This should be relatively simply accomplished by properly locating the various contacts on the shift switch $Sw_2$. Fixed resistances $Re_1$ and $Re_2$ are selected to limit the maximum holding force on the clutches to the capabilities of the transmission.

The rheostat $R_4$ is connected to the manual speed control for the driving mechanism. As an example this connection would be from the throttle or accelerator of an automobile. By reducing the field current on both $G_1$ and $G_2$ for advanced throttle positions this would permit the engine to operate at higher speeds and develop greater torque for the various clutch engagements. This control could be located in the generator output, as for example using a permanent magnet rotor for the generator.

Another refinement to the control might well be a variable impedance controlled by a linkage and bellows arrangement connected to the pressure of the intake manifold. As the manifold pressure would rise, indicating engine under load, the impedance would be increased thereby delaying shifting or decreasing torque transmission of clutches. It will be understood that the possible combinations and permutations of control factors are almost limitless. The first design objective should be reliability. Simplicity of design often supports reliability with the accompanying reduced cost a desirable factor. Where operation demand permits $G_2$ can be utilized to operate the relays $R_1$, $R_2$ and $R_3$ and $G_1$ eliminated. The design presented in the figures, however, is believed to be one of the simplest capable of satisfying normal requirements. Added factors are suggested in the discussion. For example, two windings are shown on $C_1$ of wiring diagram of FIGURE 4 to enable the car to be pushed for starting the engine when the battery is unable to do so. The same result could be obtained by providing a separate circuit under manual control. Mechanically the setting of the gear selection lever to drive would engage mechanical clutch $Cm_1$. When $C_1$ is electrialcly engaged the drive is then in low ratio.

*Five Speed Transmission With Reverse*

Figure 6:
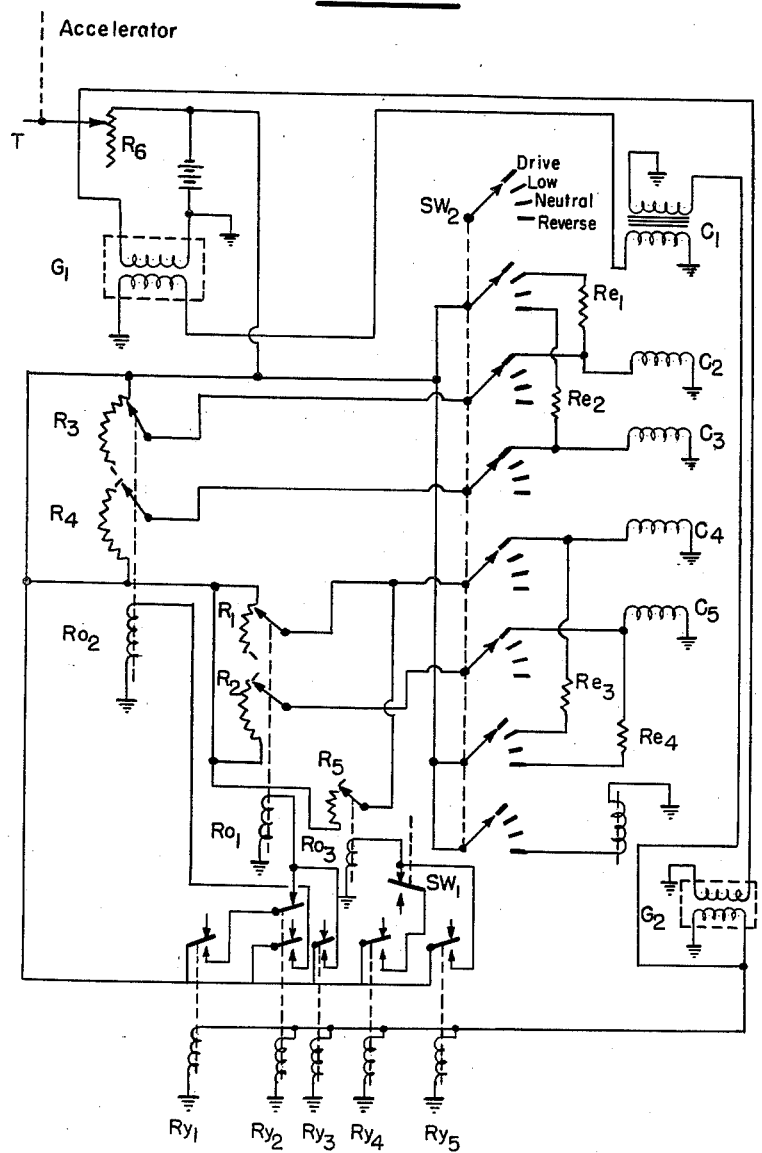
FIGURE 6 is a schematic circuit diagram representing one form of control for the transmission of FIGURE 5.

In FIGURES 5 and 6 it will be seen that the operation of the five speed transmission is basically the same as that of the three speed except one more planetary is provided, making three planetaries in line. If only four speeds forward are required, one operating sequence can be eliminated. Low gear, for example, could be engaged only by selection of the gear shift lever. Thus, a four speed transmission could be provided with three automatic gears and low speed as a manual selection. The rotary relays (Ro) drive rheostats (R) which control the current engaging the clutches. The speed of operation of these relays is controlled to provide the desired rate of engagement. If rotary relays are used the relay current is reduced in the fully actuated position by a holding contact not shown in the drawings.

The schematic mechanical diagram in FIGURE 5 outlines an arrangement of five magnetic clutches and three planetaries in line to yield a transmission with five speeds forward and one in reverse. As shown in the associated schematic wiring of FIGURE 6, the control is an extension of the one shown in FIGURE 4 to which cross-reference is made for elements, operation and interpretation.

The five speed transmission may be constructed in an automobile to operate in the following manner. With the engine idling and the shift lever in neutral position non-magnetic engaging devices $Cm_1$ and $Cm_3$ are disengaged. Magnetic engaging devices $C_2$, $C_3$, $C_4$ and $C_5$ are de-energized by open circuit at $Sw_2$. Mechanical override clutch $Cm_2$ is locked in engagement ready for selection of either low or reverse. If the engine is accelerated the voltage rise at generator $G_1$ causes a current to flow and engage magnetic clutch $C_1$, but the driven shaft does not turn because all the other clutches are disengaged.

If the selector lever is positioned to select reverse or low gear, the proper contacts are closed by $Sw_1$ so that magnetic engaging devices $C_2$ and $C_4$ for low gear drive and engaging devices $C_3$ and $C_5$ for reverse gear drive, respectively. In low gear mechanical clutch $Cm_1$ is engaged and $Cm_3$ is open or disengaged to provide a direct drive from the driving shaft to spider $A_3$ of the third planetary. If reverse is selected, mechanical engaging device $Cm_3$ is engaged to lock $A_3$ to the frame and $Cm_1$ disengaged by suitable linkages connected to the selector lever.

If the operator selects drive or normal forward, mechanical clutch $Cm_1$ is engaged and $Cm_3$ is disengaged to provide a direct drive from the driving shaft to spider $A_3$ of the third planetary gear. The motion of the car is controlled by magnetic clutch $C_1$ which engages with a force which is a function of the output of engine driven generator $G_1$. The transmission is now automatically controlled and the override clutch $Cm_2$ is fully operative.

The operation of the various engaging devices $C_1$, $C_2$, $C_3$, $C_4$ and $C_5$ is now controlled by the combined effect of the engine speed as represented by generator $G_1$, car speed as represented by generator $G_2$ and operator demand as represented by accelerator or throttle position T. Manifold vacuum may be substituted for or added to throttle position if desired where the normal 4-cycle internal combustion engine is used.

With just enough fuel supplied so that the engine idles, $Ry_1$ through $Ry_5$ are open as shown in circuit of FIGURE 6. Engaging device $C_2$ is engaged without resistance through $R_1$ and is connected to $R_5$ which is open circuited. Clutch $C_5$ is disengaged through the open circuit at $R_5$. This condition with engaging devices $C_2$ and $C_4$ engaged is the low drive of the transmission. As the engine speed increases the output of the engine driven governor $G_1$ causes magnetic clutch $C_1$ to engage progressively and set the car in motion. As the driven shaft turns generator $G_2$ builds up a voltage increasing with car speed until relay $Ry_1$ operates. $Ry_1$ closes the control circuit to $Ro_1$, which slowly opens engaging device $C_4$ and closes clutch $C_5$ through rheostats $R_1$ and $R_2$, shifting the transmission into the next higher drive ratio called LM (low medium) on FIGURE 4.

As the output of $G_2$ continues to rise with car speed relay $Ry_2$ operates, releasing $Ro_1$ and actuating $Ro_2$ so as to engage devices $C_3$ and $C_4$, and place the transmission in medium drive (med.) ratio. $Ro_1$ is loaded to operate slowly both on actuation and release. Further increase in car speed and $G_2$ output operates $Ry_3$ which again energizes $Ro_1$ and engages clutches $C_3$ and $C_5$ for a direct drive from engine to load. This direct drive is the high medium on FIGURE 4. When the car speed and $G_2$ voltages finally reach a high enough level to operate $Ry_4$, $Ro_3$ is energized and magnetic clutch $C_5$ engages, locking the planetary system $I_2$ $P_2$ $S_2$ and placing the transmission in its highest drive ratio. Here, also, as in the three speed transmission provision is made to permit step-down or kick-down into lower ratio for emergency acceleration by throttle action on switch $Sw_1$ in the actuating circuit of $Ro_3$ until $Ry_5$ operates and parallels $Sw_1$.

The use of a manifold control on the impedance could also be used to smooth operation of the automatic transmission discussed in FIGURES 3–6. By utilizing that manifold control combined with the throttle impedance the transmission could be adjusted effectively to adopt itself to hard starting pull or even to operation when cold before warming up.

Both alternating current and direct current control systems should be considered. While direct current relay operation is in general more reliable the alternating current approach has some unique possibilities which should not be overlooked.

a. Alternating current generator could have permanent magnet rotors thereby eliminating requirement for commutators.

b. These generators could be built as an integral part of the drive shafting.

c. If direct current is desired the outputs could be rectified.

d. Alternating current permits some unique impedance applications such as chokes.

e. When operating on alternating current the problems of residual permanent magnetism do not develop. An alternating current control system with direct current clutches may prove to be a desirable combination.

f. Alternating current can be controlled by band pass filters which would effectively represent speeds of the generator driving shafts.

The variable impedance indicated above as being located in the exciting circuit of the generators would have to be located in the output circuits if permanent magnet alternating current generators are used.

By judicious use of alternating current generators and clutch windings in the stationary members of the transmission all slip rings and commutators could be eliminated. There appears to be no reason why the clutch exciting coils must rotate with the clutch.

Besides the frequency pass filters mentioned there are many ways of designing and adjusting relays so that they close at one current level and open at another. Holding coils on the contacts are a possible approach. Bad effects of transient conditions can be minimized this way as well as by means of mechanical clamp and/or filters if necessary.

There are several approaches to the problems created by the transmission being shifted while carrying a moving load or being shifted into operation after the engine has been accelerated in neutral. The stoic approach of course is that if some operator did the same to the manual transmission it would grind the gear teeth off and he deserves no less to do it here. In this case, however, damage can be prevented. Actually the wiring schematics show resistances in the circuits for the low and reverse positions which could be properly selected to prevent transmission of torques sufficient to damage the gear train. A third choice would be to provide interlocking relays which would prevent shifting of the system unless a prescribed operating sequence were followed.

By relatively simple combination of the wiring of $Sw_2$, the shift selector control switch, the transmissions can be designed to provide dual range selection, manual selection of a special low with other shifts automatic, manual selection of all ratios or any other combination desired. A manually controlled resistance or impedance in the control circuit can be provided to vary the "attack" of the system or the rate or speeds at which events occur. City driving, town and country as well as hilly country or mountain driving provide three separate ranges if desired.

Throughout the design of a transmission or clutch reliability should be stressed to the extreme although I am of the opinion that the design schematics presented above can attain such design objective, I am also of the opinion that the permanent magnetic armature fixed field, alternating current generators should be seriously considered. Along with alternating current generators the possibility of utilizing frequency band filters in place of relays to effect the shifting would carry out this same objective.

If the production and assembly system and clearances can be worked out so that the clutch control windings are all located in the stationary structure of transmission then there will be no requirement for slip rings with their ever attendant maintenance problems. It is suggested that initially at least, the transmission should be build as separate planetary and clutch units. The primary or service clutch could be one unit and each planetary system with its clutches a separate unit. Were it possible to dry lubricate the gears by graphite or other similar compound the problem of oil contamination in the clutches would be eliminated.

In this connection consideration should be given to using very high carbon content iron or iron-carbon-nickel solid solutions for those applications where they can be made into self-lubricating powder or filings for a magnetic clutch. The presence of nickel resists oxidation at high temperatures and causes increased precipitation of carbon in graphitic form. "Stainless" steels are included in the above.

The control relays in the proposed transmissions could be as well combined in series as in parallel. The problem, however, will be to mass produce components cheaply which can be adjusted to operate accurately and consistently. By the simple expedient of introducing K value resistors into each relay circuit it could be possible to adjust the shift points.

In general, generators here employed are interchangeable by variable impedance devices controlled by shaft speed or by the centrifugal shifting of magnets to increase or decrease generator field strength or the effective field acting on the particle mass. The windings of the armatures of the generators can be made mechanically integral with the clutches. Such an arrangement could provide extremely simple and reliable operation where alternating current clutch actuators are employed. Where direct current clutch actuators or coil supply is used commutation on either the stator input or armature output is normally employed.

The invention lends itself to wide application in the fields of power transmission, speed reduction, clutch drives, load lifting and load application. It is especially valuable where heavy loads are involved. It is, however, equally applicable to control and indication applications such as governors and the like.

A table of various useful combinations of control arrangements of which the figures of the drawing herein are representative examples, is found in my U.S. Patent No. 2,718,157. Reference is made to my copending application Ser. No. 535,012, filed on September 19, 1955, and Ser. No. 535,013, now U.S. Patent No. 3,006,656 granted October 31, 1961.

Where the term impedance is used it is employed generically and may include a combined group of several separate but associated resistors, inductances and/or capacitances. For example, the control circuit impedance may include an impedance controlled by the accelerator of an automobile, another controlled by the manifold pressure and a third subject to manual control, all in the same circuit in series, series-parallel or parallel combinations depending upon the control effect desired. For the normal automotive application all may be in series. As noted above, the relation of some of the impedances may be an inverse function, and may be increased or decreased in value with the controlling factor depending upon the manner of connection.

The vehicle employed may be oil or include oil. Glycerine may be employed where the loads are light and heating effects are limited. For heavier loads the pasty and dry powder mixes avoid bearing contamination and resist bad effects of localized heating. The magnetic material may be powdered magnetite which is the fully oxidized magnetic oxide of iron, carbonyl iron, iron-nickel compounds and the like.

For example the pasty mass mentioned above may comprise the finely divided magnetic material mixed with a relatively small amount of oil while the powdered form may be the finely divided magnetic material alone or with a very small amount of oil. For heavy duty transmissions such as automobiles, diesel locomotives, cranes and the like, it is preferred to use the dry finely divided magnetic material alone or a powdery mixture of the magnetic material with oil or graphite which provides some lubrication without caking on the one hand or penetration of the journal bearing seals on the other hand.

Bearing contamination may be avoided as described above, but local heating effects between the magnetic mass and the moving parts require that the vehicle, when used at all, be stable at fairly high temperatures where loads are substantial as in the automotive field. For such applications the dry mass in powder form or as filings is preferred. The terms powder and filings are in many cases substantial equivalents and the terms "particle," "powdery" and "finely divided material" are intended to include both.

The localized heating due to point or very small area friction contact not only tends to break down oil and glycerine vehicle, but may affect the magnetic material itself by corrosion or oxidation due to high temperatures which may also change the physical and chemical characteristics of the magnetic material. For this reason in some applications the fully oxidized magnetite, $Fe_3O_4$, may function better than carbonyl iron, $Fe(CO)_4$, in which the carbonyl radical may be unstable at the required peak operating temperature. For this reason the iron-nickel compounds are mentioned above in addition to iron-carbon compounds as representative of the large class of magnetic alloys in general which have good magnetic properties over a wide range of temperatures and resist corrosion, oxidation and other undesirable changes when under load and subject to localized high temperatures. These examples are representative and are not intended to be limited either as individual items or as a class.

The showing in the drawing is highly schematic and it will be understood that it is within the spirit of the invention to utilize well known principles of design in working out optimum paths for magnetic flux. For example, the existing coils may obviously be inserted in the housing wall or contained inside the housing itself.

While there have been described above what are at present considered to be the preferred embodiments of the invention, it will be apparent to those skilled in the art that various changes and modifications may be made therein, in the light of the above disclosure, without departing from the spirit or scope of the invention. Accordingly the appended claims have been variously worded in generic terms to include all those modifications and equivalent structures which fall within the true spirit of the invention.

I claim:

1. In a power drive, a drive shaft for supplying power, a driven shaft for delivering power, a plurality of engaging device means for connecting both said shafts in a power transmitting relation and comprising finely divided magnetic material, means mounted for rotation embedded in said material and flux producing means to subject said magnetic material to a magnetic field and cause it to grip said means mounted for rotation, an electrical circuit connected to said flux producing means and means for producing a variable current in said circuit comprising an element driven by one of said shafts whereby the current in said circuit and the effective magnetic flux produced by said flux producing means are a function of the angular velocity of said one of said shafts, said means for connecting both said shafts comprising a plurality of pairs of relatively movable members having an annular space therebetween, said finely divided magnetic material being substantially confined to said annular space, said means to vary the current in said circuit comprising an impedance, said circuit comprising a delayed action relay means connected to act in response to the variation in current produced by said element driven by one of said shafts and operative in said electrical circuit to energize the magnetic material between one pair of relatively movable members and to energize the magnetic material between another pair.

2. The combination set forth in claim 1, said pairs of movable members forming parts of at least one planetary gear system, said relay means being constructed to energize the magnetic material between pairs of relatively movable members in sequence.

3. The combination set forth in claim 1, said finely divided magnetic material comprising corrosion and heat resistant magnetic alloy formed in a cylindrical shell between said relatively movable members comprising said pairs.

4. A heavy duty coupling device comprising a driving member and a driven member, bearing means mounting said members for relative movement with respect to each other, a force transmitting bonding mixture, means to hold said mixture in contact with both said members, said mixture comprising finely divided magnetic material in powder form, said mixture being responsive to the action of a magnetic field to bond together in force transmitting relation with respect to said members whereby the force transmitted by said members is a function of effective magnetic field strength and the active surfaces of said bearings remain substantially free of said powdery magnetic material, and electric coil means for establishing a magnetic field for controlled bonding effect on said magnetic material, a drive shaft, a driven shaft, a plurality of said coupling devices constructed to connect said shafts in a desired drive relation, and electrical circuit for controlling the effective magnetic field in each said coupling device selectively, said circuit comprising at least one said electric coil means for each said coupling device with its respective bonding mixture, a first generator driven by said drive shaft, a second generator driven by said drive shaft, a plurality of relays constructed and connected to operate in response to the output of one of said generators, a plurality of variable impedances connected for the selective control of the effective impedance of operative parts of said circuit in response to the action of said relays, at least one of said relays being constructed to operate with delayed action with respect to another of said relays.

5. The combination set forth in claim 4, means forming a film around individual magnetic particles whereby to improve the clutching action thereof on the application of a magnetic field.

6. The combination set forth in claim 5, said coupling devices forming parts of at least one planetary system said relays being so connected in said circuit that they operate in response to the output of said second generator.

7. In a power drive, means for supplying power, means for delivering power, means for connecting both said means in a power transmitting relation comprising relatively movable members having finely divided magnetic material therebetween and flux producing coil means to subject said material to a magnetic field and cause it to grip said relatively movable members, effective magnetic flux varying means connected to be driven by at least one of said power means and to vary the effective magnetic flux at least in part in response to changes in velocity of said one of said power means, said relatively movable members being constructed to drive a gearing system with at least part of said magnetic material in the form of a thin cylinder between said relatively movable members and in contact therewith, and an electrical circuit comprising said coil means, said magnetic flux varying means, a plurality of variable resistances selectively connectable to said circuit in series with said coil means and a plurality of relays connected in parallel with said flux varying means and constructed to connect said variable resistances selectively to said circuit, at least one of said relays being constructed to operate with delayed action with respect to another of said relays.

8. In an automatic multiple step planetary transmission vehicular power drive, a vehicle having an engine and a throttle, a drive shaft, a driven shaft, a planetary transmission having a plurality of magnetic particle clutches and constructed to connect said shafts in driving relation, an automatic electric control circuit for said power drive comprising a magnetic field producing coil for each said clutch, said coils being positioned to produce a controlled magnetic field for the magnetic particles of the respective clutches, said circuit comprising a generator driven by said drive shaft, a plurality of relays sequentially operable in response to the output of said generator, a plurality of variable impedances selectively connectable to said circuit in series with selected ones of said coils, slowly acting means for connecting at least selected ones of said variable impedances, said slowly acting means being controlled by said relays.

9. The combination set forth in claim 8, said slowly acting means comprising a plurality of rotary relays each having a dash pot and check valve release.

10. The combination set forth in claim 8, a gear lever, a gang switch having mechanical connections to said lever and electrical connections in said circuit to determine the sequences of operation of said drive.

11. A magnetic particle vehicular transmission comprising in combination an engine driven generator, a vehicle driven generator, a plurality of magnetic particle engaging devices each having a flux-producing coil, a plurality of relays connected to said vehicle driven generator and constructed to operate sequentially in response to increase in voltage rise in said vehicle driven generator, a plurality of variable impedances connected between said engine driven generator and said flux-producing coils, and connecting means comprising delayed action means controlled by said relays and controlling at least selected ones of said variable impedances to vary the value of said impedances and the value of the flux produced by said flux-producing coils.

12. A magnetic particle transmission for an automatic vehicle having a drive shaft, a driven shaft, an engine and an accelerator, comprising a fiirst pair of spaced relatively movable coupling members defining a gap therebetween, a first means for establishing a magnetic field across said gap, a mass of magnetic particles in said gap and responsive to said field for establishing a force-transmitting bond between said members, said particle mass being physically and chemically stable under the conditions of operation of said transmission to provide a cohesive effect which is a substantially continuous function of said magnetic field, a first generator means driven by said drive shaft, a second generator means driven by said driven shaft, said first means for establishing a magnetic field being connected to be energized by both said first and said second generator means, a second pair of spaced relatively movable coupling members defining a gap therebetween, a mass of magnetic particles in said gap, a second means for establishing a magnetic field across the gap defined by said second pair of spaced coupling members, electric circuit means connecting said second means for establishing a magnetic field to said first generator means to be energized thereby, said electric circuit means containing a variable resistance element, slow-operating quick-return relay means for varying said resistance element, and the effective magnetic field produced by said second means for establishing a magnetic field.

13. The combination set forth in claim 12, said pairs of spaced coupling members each having spaced cylindrical surfaces defining said gaps, respectively, and forming said particle masses into thin cylinders of sufficient thickness to provide sound gripping action with respect to said spaced coupling members comprising said pairs of coupling members.

14. The combination set forth in claim 13, a third pair of spaced relatively movable coupling members defining a cylindrical gap therebetween having a mass of magnetic particles therein, a third means for establishing a magnetic field across the gap defined by said third pair of spaced coupling members, said electrical circuit means comprising a second variable resistance element controlled by said slow-operating quick-return relay, a third variable resistance element, a second slow-operating quick-return relay controlling said third variable resistance and means connected to said second generator means for operating said relays cooperatively as the speed of said driven shaft increases whereby force is transmitted from said drive shaft to said driven shaft in a desired manner.

15. The combination set forth in claim 14, said transmission being planetary, said second pair of coupling members comprising a brake to hold one part of said planetary transmission.

16. The combination set forth in claim 15, said circuit means comprising means for connecting said first variable resistance element in series with said second means for establishing a magnetic field, said circuit means comprising means for connecting said second variable resistance element in series with said third means for establishing a magnetic field.

17. The combination set forth in claim 16, said circuit means having a fourth variable resistance element connected in series with said first generator means and controlled by said accelerator and switching means for connecting, selectively, at least one of said first and said third variable resistance elements in series with one of said second and said third means for establishing a magnetic field.

18. The combination set forth in claim 17, said planetary transmission comprising a fixed means, a sun gear, a ring gear, a planetary carrier, said first pair of spaced coupling members comprising a member carried by said drive shaft and a member carried by said planetary carrier, said second pair of spaced coupling members comprising a member carried by said ring gear and a member carried by said fixed means and said third pair of spaced coupling members comprising a member carried by said ring gear and a member carried by said planetary carrier.

References Cited in the file of this patent

UNITED STATES PATENTS

| | | |
|---|---|---|
| 2,575,360 | Rabinow | Nov. 20, 1951 |
| 2,615,945 | Jaeschke | Oct. 28, 1952 |
| 2,658,408 | Miller | Nov. 10, 1953 |
| 2,688,388 | Gill | Sept. 7, 1954 |
| 2,695,675 | Frye | Nov. 30, 1954 |
| 2,709,928 | Jones | June 7, 1955 |
| 2,718,157 | Schaub | Sept. 20, 1955 |
| 2,907,423 | Jaeschke | Oct. 6, 1959 |
| 2,920,496 | Forster | Jan. 12, 1960 |